United States Patent [19]

Altpeter et al.

[11] Patent Number: 5,029,746
[45] Date of Patent: Jul. 9, 1991

[54] ULTRASONIC WELDING DEVICE

[75] Inventors: Arno Altpeter, Sindelfingen; Carsten Bauer, Stuttgart, both of Fed. Rep. of Germany

[73] Assignee: Robert Bosch GmbH, Stuttgart, Fed. Rep. of Germany

[21] Appl. No.: 478,272

[22] Filed: Feb. 9, 1990

[30] Foreign Application Priority Data

Mar. 3, 1989 [DE] Fed. Rep. of Germany ... 8902562[U]

[51] Int. Cl.$^5$ .............................................. B23K 20/10
[52] U.S. Cl. .................................... 228/1.1; 228/44.7; 228/4.5
[58] Field of Search ....................... 228/1.1, 44.7, 110, 228/179, 212, 4.5; 29/597

[56] References Cited

U.S. PATENT DOCUMENTS

| | | | |
|---|---|---|---|
| 2,985,954 | 5/1961 | Jones et al. | 228/1.1 |
| 4,019,876 | 4/1977 | Stöckel et al. | 228/110 |
| 4,369,910 | 1/1983 | Hamano et al. | 228/110 |

FOREIGN PATENT DOCUMENTS

| | | |
|---|---|---|
| 1228494 | 11/1966 | Fed. Rep. of Germany . |
| 2739730 | 3/1978 | Fed. Rep. of Germany . |
| 3017426 | 11/1981 | Fed. Rep. of Germany . |
| 56-12839 | 2/1981 | Japan ................................ 29/597 |

Primary Examiner—Sam Heinrich
Attorney, Agent, or Firm—Michael J. Striker

[57] ABSTRACT

An ultrasonic welding device for mounting wire ends or wire loops on terminal lugs, particularly on terminal lugs or lamellas of drum-shaped commutators for rotating electrical machines, the arrangement comprises a sonotrode, an anvil against which terminal lugs abut during a welding process, and supporting surfaces provided on the anvil and on a free end of each terminal lug for taking up a sonotrode pressure and sonotrode vibrations transverse to a pressure direction. The supporting surfaces abut against one another before a start of a welding process by a relative movement of the anvil and the terminal lugs.

6 Claims, 1 Drawing Sheet

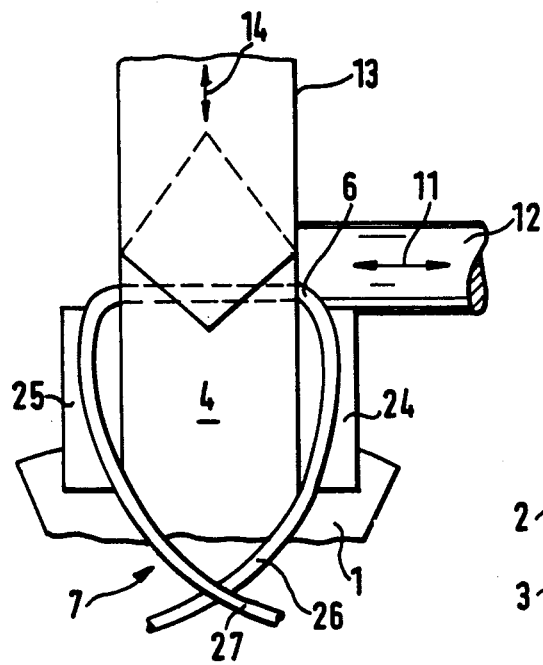
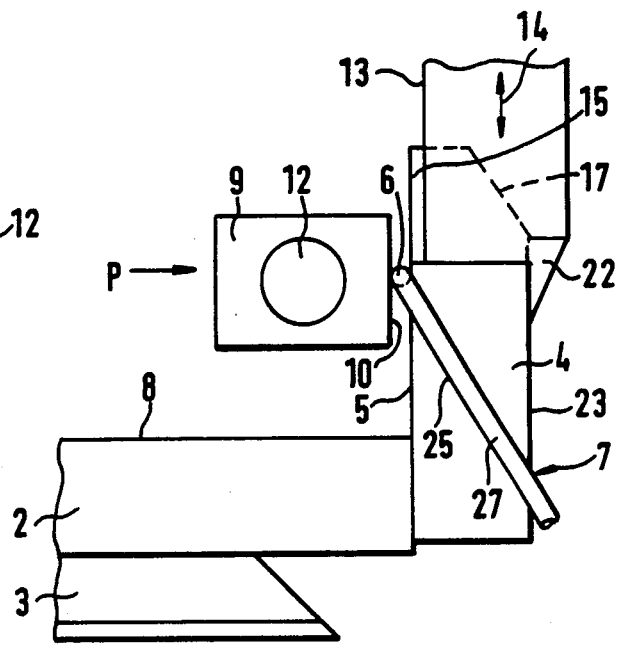
FIG. 1   FIG. 2
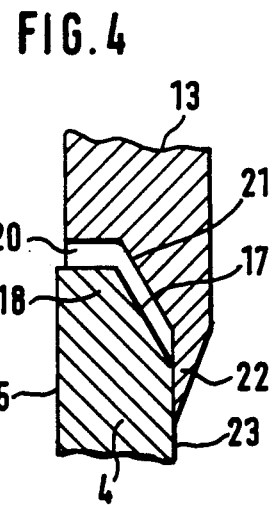
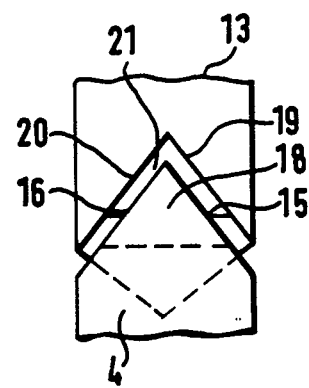
FIG. 4   FIG. 3

ULTRASONIC WELDING DEVICE

BACKGROUND OF THE INVENTION

The present invention relates to an ultrasonic welding device for mounting of wire ends or wire loops on terminal lugs, particularly on terminal lugs of lamellas of drum-shaped commutators for rotatable electrical machines.

Devices of the above mentioned general type are known in the art. The German document DE-OS 2,739,730 discloses a method of producing an armature for dynamoelectric machines, in which the conductor parts of the armature winding are electrically and mechanically connected with commutator lamellas by ultrasonic action. The conductors are mounted either on the terminal-side ends of the brush running surfaces or for the purpose of increasing the contact surfaces, in the recesses of the lamellas. A further method for producing an electrically conductive and mechanical connection of the armature winding wires with the lamellas of a commutator is disclosed in the German document DE-OS 3,017,426. Here also the connection is produced by ultrasonic welding, and the commutator lamellas are rolled on the contact surfaces of a sonotrode. When this method is used in connection with hook lamellas, the hooks which receive the winding wire loops are bent during rolling by the sonotrode in direction to the lamellas and welded on the lamellas. A sonotrode is also known for cold pressing welding of metallic workpieces with the use of vibrations performed parallel to the contact surface of the workpiece. The end of the sonotrode, for example a wire, which is brought in contact with the workpiece, engages the workpiece in the swinging direction of the sonotrode. This method is disclosed in the German document DE-AS 1,228,494. For producing of wire grids the wires which are located under the wires engaged by the sonotrode device can be inserted in corresponding groove recesses of an anvil. In accordance with a further embodiment, a cylindrical knob is welded on a flat plate, and the plate is held during the welding process inside a bearing point in its position.

SUMMARY OF THE INVENTION

Accordingly, it is an object of the present invention to provide an ultrasonic welding device of the above mentioned general type, which avoids the disadvantages of the prior art.

More particularly, it is an object of the present invention to provide an ultrasonic welding device of the above mentioned type, in which between each terminal lug and the anvil, a form-locking connection is produced during the welding process, so that the ultrasonic vibrations are taken by the anvil and thereby held far from the lamellas anchoring or in other words from the isolating material hub of the commutator.

In keeping with these objects and with others which will become apparent hereinafter, one feature of the present invention resides, briefly stated, in an ultrasonic welding device in which the anvil and the free end of each terminal lug are provided with supporting surfaces which take up the sonotrode pressure and the sonotrode vibrations extending transverse to the pressure, so that before a start of the welding process they are placed on one another by a relative movement of the anvil and the terminal lugs.

When the ultrasonic welding device is designed in accordance with the present invention, it eliminates the disadvantages of the prior art and achieves the above mentioned objects.

A mechanical shaking of the lamellas anchoring during the welding process is avoided and a reliable welding in a mass production is ensured. It is further important that the form-locking support is limited to the free end of the terminal lugs, so that the winding wire produced in a different shape than in the example can be guided from the welding point, for example approximately parallel to the longitudinal axis of the commutator.

In accordance with an especially advantageous embodiment of the present invention, the supporting surfaces are formed as centering surfaces for the terminal lugs. It is therefore ensured that the eventual defective positions of the terminal lugs are corrected before the welding process and the contact surfaces of the lugs are oriented relative to the sonotrode.

The above mentioned centering can be achieved in an especially simple manner in accordance with a further feature of the present invention, in that the supporting surfaces of the anvil and/or the terminal lugs are inclined relative to their longitudinal axes.

In accordance with a still further feature of the present invention, the supporting surfaces can be provided on a projection of the anvil or the terminal lug on the one hand, and on a depression of the terminal lug or the anvil on the other hand, so that the projection engages in the depression.

The depression and the projection can be shaped as a pyramid with supporting surfaces extending perpendicular to one another.

The projection can be formed on a free end of the terminal lugs, while the depression can be formed in the anvil.

The supporting surface of the depression which takes up the sonotrode pressure can be further provided with a tongue-shaped extension additionally abutting against an outer surface of the terminal lugs, which outer surface is parallel to its contact surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a portion of a commutator provided with lamellas as well as essential parts of an ultrasonic welding device in accordance with the present invention during a welding process on a plan view;

FIG. 2 is a side view of the ultrasonic welding device and the commutator of FIG. 1;

FIG. 3 is a view showing an end piece of the terminal lugs of a lamella and a part of a somewhat lifted anvil with the supporting surfaces on a plan view; and FIG. 4 is a view showing a longitudinal section of the parts shown in FIG. 3.

DESCRIPTION OF A PREFERRED EMBODIMENT

A commutator for electrical machines has a hub which is identified with reference numeral 1 in FIG. 1 and composed of an isolating material. A not shown machine shaft extends through the hub 1 and is firmly connected with it for joint rotation. A plurality of lamellas 2 are anchored in the hub 1. They are arranged radially to the longitudinal axis of the commutator and isolated from one another. Each lamella has a foot 3 which is enclosed by the isolating material of the hub 1. Each of the lamellas 2 has at its one end a terminal lug 4 with a contact surface 5. A loop 6 of a winding wire 7 of a machine rotor is mounted on the contact surface 5 of the terminal lug 4. The radially outwardly directed terminal lugs form an angle of 90° or somewhat more than 90° with brush running surfaces 8 of the lamellas 2.

The loop 6 of the winding wire 7 is mechanically and electrically contacted with the terminal lug 4 in the region of its surface 5 by ultrasonic welding. For this purpose, an ultrasonic sonotrode 12 is provided. A head 9 of the sonotrode has a roughened contact surface 10 which abuts against the wire loop 6. A head 9 of the sontrode swings with the rod 12 of the sonotrode in direction of the double arrow 11. The ultrasonic welding device also has an anvil 13 which is arranged above the terminal lug 4 movably in direction of the double arrow 14.

The anvil 13 and the free end of the terminal lug 4 are provided with supporting surfaces which will be described later on. The supporting surfaces take up the sonotrode pressing force acting in direction of the arrow P and the sonotrode vibrations acting in direction of the arrow 11. It is thereby guaranteed that the pressing force and the sonotrode vibrations during the welding process are held far from the commutator hub 1.

In the shown embodiment the supporting surfaces 15, 16, 17 associated with the terminal lugs 4 are formed as outer surfaces of a projection 18. The supporting surfaces 19, 20, 21 of the anvil 13 are formed by walls of a depression provided in the anvil. The projection 18 form-lockingly engages with the walls of the above mentioned depression as shown in FIGS. 1 and 2.

As can be seen from the drawings, the supporting surfaces 15, 16, 17 of the terminal lug 4 and the supporting surfaces 19, 20, 21 associated with the anvil 13 are formed as centering surfaces for the terminal lugs. They correct the defective positions of the lug relative to the sonotrode 9 in direction of the longitudinal axis and in the rotary direction of the commutator hub 1 before the welding process. The supporting surfaces are inclined toward one another at an acute angle in direction of the longitudinal axis of the terminal lug 4 or the anvil 13. The respective complementary surface pairs 15, 19; 16, 20; 17, 21 extend parallel to one another. The supporting surfaces 15, 16, 17 of the projection 18 and the supporting surfaces 19, 20, 21 of the anvil 13 form the walls of a three-side pyramid, and these walls in a cross-section are arranged perpendicularly to one another.

The supporting surface 21 of the anvil 13 has a tongue-shaped projection 22. During the welding process, the projection 22 abuts an outer surfaces 23 of the terminal lug 4 and which extends parallel to the contact surface 5 of the terminal lug, and provides additional support for the terminal lug 4. The projection 22 is located, during the welding process, at substantially the same height as the ultrasonic sonotrode 9 and thereby unloads the inclined supporting surfaces 17, 21.

For ensuring a definite height of the wire loop 6 under the sonotrode 9, positioning surfaces 24 and 25 are associated with the terminal lug 4. They provide the positioning of the wire loop 6 in the longitudinal direction of the terminal lug 4. The positioning surfaces 24, 25 are provided in the shown example at both small sides of the terminal lug 4 so that they determine the position of both legs 26, 27 of the wire loop 6 and thereby the position of the contact point on the contact surface 5 of the terminal lug 4. The positioning surfaces 24, 25 are formed as one-side abutment surfaces for both wire loop legs 26 and 27 by respective shaping of the terminal lug 4 or the hub 1. The surfaces are inclined to the longitudinal axis of the lamella 2 and thereby the machine rotor, so that their extension intersects the axis under an acute angle.

The commutator hub 1 provided with the lamellas 2 and the winding wire loop 6 placed around the terminal lugs 4 is clamped in a not shown rotary holder and positioned so that the projection 18 of one terminal lug 4 is located under the anvil 13. The anvil arranged movably in a not shown guide is located outside the rotary circle of the terminal lugs. The sonotrode 9 is lifted so that its friction surface 10 does not contact the wire loop 6.

Before starting the welding process, the anvil 13 is lowered to the position shown in FIGS. 1 and 2. In this position, the supporting surfaces 19, 20, 21 of the anvil and supporting surfaces 15, 16, 17 of the terminal lug 4 are in contact, and the angular position of the lug relative to the longitudinal axis of the commutator and in the rotary direction is corrected when needed. Then the sonotrode 9 is placed on the wire loop 6 and the vibration generator is turned on. The supporting surfaces serve for holding the forces produced during the welding process far from the lamella 2 and its anchoring.

The ultrasonic energy is applied in the region of the loop 6 directly to the wire 7. Thereby a small heat quantity suffices for heating the wire so much that it is deformed with breakage of its isolation and provides a welding connection with the contact surface 5 of the terminal lug. The lamella 2 and the isolating material hub 1 of the commutator are not significantly thermally loaded. The position of the wire loop 6 is provided by the surfaces 24, 25 and lies substantially in the center of the sonotrode friction surface 10. Thereby downward sliding of the wire loop 6 during the winding process which can result in disengagement from the sontrode 9, is prevented.

The supporting surfaces 19, 20, 21 of the anvil 13 lie outside of the outer surface 23 of the terminal lug 4 parallel to the contact surface 5. Therefore, the greater part of the outer side 23 is not contacted by the anvil and simultaneously an accurate positioning of the terminal lug relative to the sonotrode 9 with form-locking holding is ensured.

Instead of the construction shown in the example, the supporting surfaces associated with the anvil can be arranged as outer surfaces on a projection or an extension. The terminal lug in this case would have a depression with walls for form-locking accommodation of the projection. However, it is recommended that the anvil be arranged perpendicularly to the terminal lug and provided for example with a conical pin. During the welding process the conical pin engages from outside in a correspondingly formed depression of the terminal lug.

It will be understood that each of the elements described above, or two or more together, may also find a useful application in other types of constructions differing from the types described above.

While the invention has been illustrated and described as embodied in an ultrasonic welding device for mounting wire ends or wire loops on terminal lugs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An ultrasonic welding device for mounting wire ends or wire loops on terminal lugs of lamellas of drum-shaped commutators for rotating electrical machines, the terminal lugs having a free end defining first supporting surfaces thereon, said device comprising a sonotrode for ultrasonic welding of the wire end or the wire loops to the terminal lugs; and an anvil having second supporting surfaces for engaging the first supporting surfaces on the terminal lugs to support the terminal lugs during a welding process and to take a sonotrode pressure and sonotrode vibrations in a direction transverse to a sonotrode pressure direction and away from a location where a lamella is anchored to a commutator.

2. An ultrasonic welding device as defined in claim 1, wherein said second supporting surfaces are formed as centering surfaces for the terminal lugs.

3. An ultrasonic welding device as defined in claim 1 wherein said second supporting surfaces are inclined relative to a longitudinal axis of said anvil for engaging the first supporting surfaces of the terminal lugs which are inclined to a longitudinal axis of the terminal lugs.

4. An ultrasonic welding device as defined in claim 1, wherein said second supporting surfaces form a depression for receiving a projection formed by the first supporting surfaces.

5. An ultrasonic welding device as defined in claim 1, wherein said depression has a pyramidal shape for engaging a pyramide-shaped projection formed by the first supporting surfaces.

6. An ultrasonic welding device as defined in claim 5, wherein one of said second supporting surfaces has a tongue-shaped extension for engaging outer surfaces of the terminal lugs and which extend parallel to contact surfaces of the terminal lugs.

* * * * *